(12) United States Patent
Dichtl et al.

(10) Patent No.: US 9,108,847 B2
(45) Date of Patent: Aug. 18, 2015

(54) METHOD AND PLANT FOR REPROCESSING WASTE SULPHURIC ACIDS FROM NITRATION PROCESSES

(75) Inventors: Gottfried Dichtl, Nieder-Olm (DE); Harald Steeg, Bacharach (DE)

(73) Assignee: DE Dietrich Process Systems GMBH (DE)

( * ) Notice: Subject to any disclaimer, the term of this patent is extended or adjusted under 35 U.S.C. 154(b) by 597 days.

(21) Appl. No.: 13/395,810

(22) PCT Filed: Sep. 8, 2010

(86) PCT No.: PCT/EP2010/005512
§ 371 (c)(1),
(2), (4) Date: Mar. 13, 2012

(87) PCT Pub. No.: WO2011/032659
PCT Pub. Date: Mar. 24, 2011

(65) Prior Publication Data
US 2012/0168298 A1    Jul. 5, 2012

(30) Foreign Application Priority Data
Sep. 15, 2009 (EP) .................................. 09011773

(51) Int. Cl.
*C01B 21/46* (2006.01)
*B01D 3/14* (2006.01)
*C01B 17/94* (2006.01)

(52) U.S. Cl.
CPC ............. *C01B 21/46* (2013.01); *B01D 3/143* (2013.01); *B01D 3/148* (2013.01); *C01B 17/94* (2013.01); *B01J 2219/00006* (2013.01)

(58) Field of Classification Search
CPC .......... B01D 3/14; B01D 3/143; B01D 3/148; C01B 17/94; C01B 21/46

USPC ................... 202/154; 203/42, 43, 61, 92, 96; 423/394.2, 531; 95/162, 168; 210/634
See application file for complete search history.

(56) References Cited

U.S. PATENT DOCUMENTS

| | | | |
|---|---|---|---|
| 4,650,912 A * | 3/1987 | Pohl et al. ..................... | 568/934 |
| 5,275,701 A * | 1/1994 | Mazzafro et al. .............. | 203/12 |

(Continued)

FOREIGN PATENT DOCUMENTS

| | | |
|---|---|---|
| DE | 19636191 A1 | 2/1998 |
| DE | 102006013579 B3 | 8/2007 |

(Continued)

OTHER PUBLICATIONS

International Search Report for PCT/EP2010/005512 dated Nov. 3, 2010.

Primary Examiner — In Suk Bullock
Assistant Examiner — Jonathan Miller

(57) ABSTRACT

A method for reprocessing waste acid from methods for producing nitro-aromatics, in particular for producing dinitrotoluene (DNT) or trinitrotoluene (TNT), to recover concentrated and purified sulfuric acid and nitric acid, wherein in a first stage, the waste acid is separated in a stripping column countercurrently with water vapor from the bottom of the stripping column into at least one vapor phase, which contains nitric acid and possibly nitro-organics, and a pre-concentrated sulfuric acid, and the vapor phase and the pre-concentrated sulfuric acid are condensed and/or reprocessed in downstream method stages, wherein in the first stage of the method, in addition to the stripping, the nitric acid contained in the stripping vapor is concentrated in the presence of additional concentrated sulfuric acid so that nitric acid in a highly concentrated form suitable for feeding back into the nitration process is obtained directly in the first stage.

20 Claims, 2 Drawing Sheets

(56) References Cited

U.S. PATENT DOCUMENTS

Figure 1:
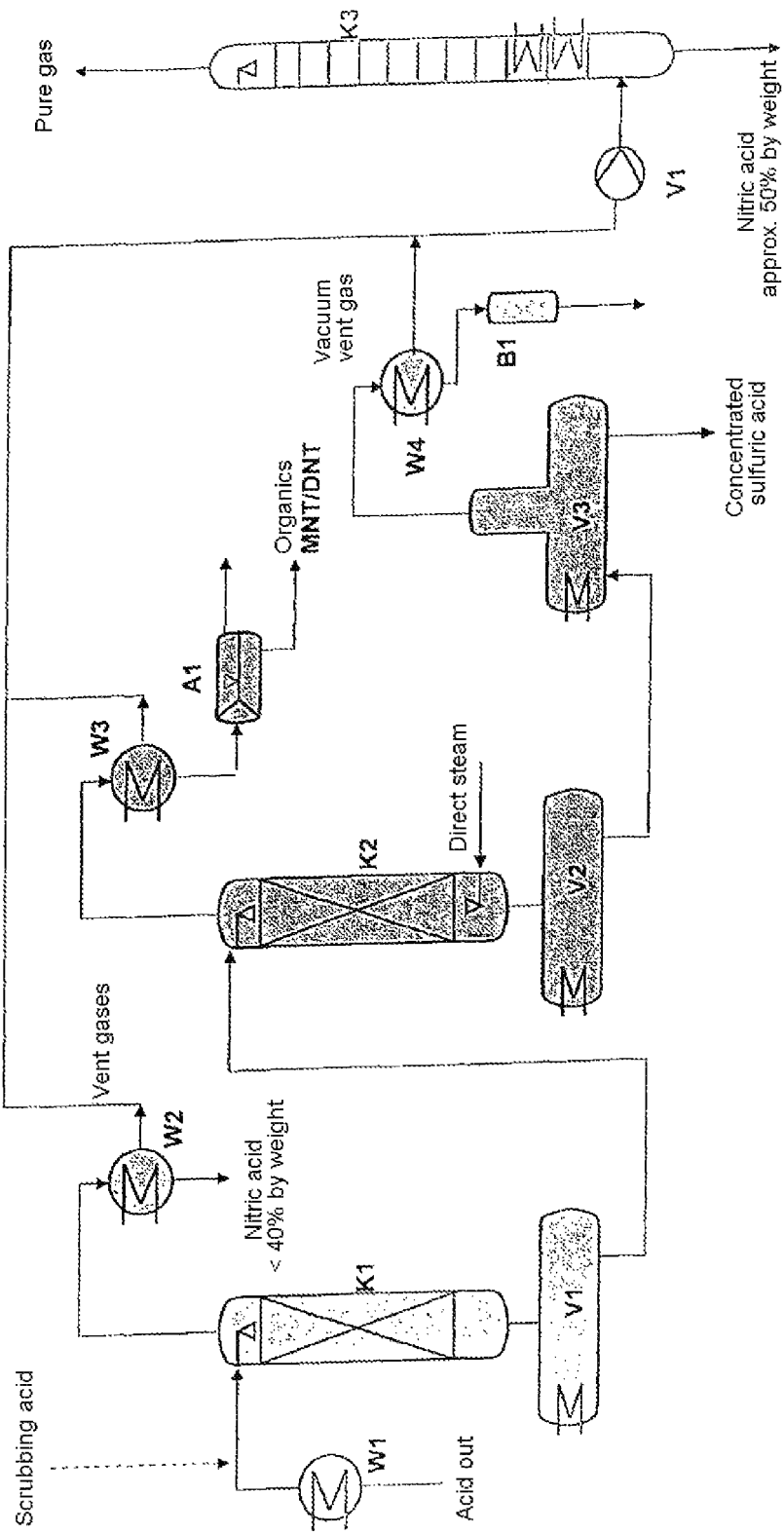

| | | | |
|---|---|---|---|
| 5,589,037 A * | 12/1996 | Guggenheim et al. | 203/35 |
| 6,156,288 A | 12/2000 | Beckhaus et al. | |
| 6,506,948 B1 * | 1/2003 | Sawicki | 568/934 |
| 6,969,446 B1 * | 11/2005 | Dichtl et al. | 203/13 |
| 7,988,942 B2 * | 8/2011 | Walter et al. | 423/522 |
| 2010/0233069 A1 | 9/2010 | Walter et al. | |
| 2012/0228218 A1 * | 9/2012 | Fritz et al. | 210/631 |
| 2012/0248038 A1 * | 10/2012 | Fritz et al. | 210/639 |

FOREIGN PATENT DOCUMENTS

| | | |
|---|---|---|
| EP | 0155586 A1 | 3/1985 |
| EP | 1876142 B1 | 9/2008 |

\* cited by examiner

METHOD AND PLANT FOR REPROCESSING WASTE SULPHURIC ACIDS FROM NITRATION PROCESSES

CROSS REFERENCE TO RELATED APPLICATIONS

This application is a national stage filing under section 371 of International Application No. PCT/EP2010/005512 filed on Sep. 8, 2010, and published in German on Mar. 24, 2011 as WO 2011/032659 A1 and claims priority of European application No. 09011773.0 filed on Sep. 15, 2009, the entire disclosure of these applications being hereby incorporated herein by reference.

The present invention relates to a process and a plant for workup, i.e. separation, purification and concentration, of spent and diluted sulfuric acid from nitration processes, in which nitric acid is used as the nitration medium in the presence of sulfuric acid. Such a diluted sulfuric acid is generally referred to in the present application as "waste acid" for short.

Nitration processes play a central role in the chemical industry for preparation of nitro compounds, and are performed on an industrial scale. The nitro compounds prepared serve, due to the numerous possible reactions of nitro groups and the conversion products preparable therefrom, in most cases as valuable intermediates.

The nitration of aromatic compounds is particularly important, for example of toluene, to prepare nitroaromatics, especially dinitrotoluene (2,4-dinitrotoluene; DNT) or trinitrotoluene (TNT), since aromatic nitro groups can be converted to amino groups in a simple manner by reduction, and these in turn can be subjected to numerous further conversions. A particularly important way of further processing DNT, for example, is that to give toluene diisocyanate (TDI) after an initial reduction of DNT to toluenediamines and a subsequent reaction with phosgene, or else by direct reaction of the DNT with CO. TDI is one of the most important aromatic diisocyanates for preparation of polyurethanes.

The introduction of one or more nitro groups into an aromatic compound, for example toluene, is effected as an electrophilic substitution with the aid of nitric acid in a mixture with sulfuric acid, for example in one stage with nitrating acid (this term refers to mixtures of concentrated sulfuric acid and nitric acid of different composition) or, in the case of dinitration, as in the case of preparation of DNT, optionally also in two stages with acids of different strength, a typical two-stage process involving nitration of toluene to mononitrotoluene (MNT) in the first stage, using a less concentrated, optionally worked up waste acid from the second stage, and then introduction of a further nitro group into this MNT in the second stage using a highly concentrated nitric acid to form DNT (cf., for example, EP 155 586 A1).

While the nitric acid content of the nitrating acid is consumed in a very high proportion in the course of introduction of the nitro groups as substituents on the aromatic ring, the concentrated sulfuric acid present at the same time during the nitration is merely diluted and contaminated by the water of reaction which forms. It forms the "waste acid", which typically consists principally of an about 70% by mass sulfuric acid and water, and smaller proportions of nitric acid, nitroorganics, for example mononitrotoluene (MNT) and dinitrotoluene (DNT), and also nitrous constituents in the form of, for example, nitrosylsulfuric acid.

It is an absolute requirement of a modern economic process regime to work up this waste acid and to convert it to a concentrated sulfuric acid which can be reused in the process.

Use of fresh sulfuric acid for the nitration process has been unacceptable for a long time for economic and environmentally relevant reasons.

Therefore, nowadays, reconcentration of the stream of waste acid is regularly conducted to sulfuric acid concentrations between 85% by mass and 97% by mass, and the aim must be to achieve such reconcentration with a minimum energy input and the formation of very small amounts of chemically polluting waste streams which have to be discharged from the process.

An increase in the sulfuric acid concentration up to a maximum sulfuric acid content of 96% by mass, which is advisable under reduced pressure conditions due to the thermodynamic process prerequisites in the last stages, has been state of the art for decades with the development of materials of high corrosion resistance which are suitable therefor, such as tantalum, enamel and glass, for the evaporation at high temperatures. However, a restriction which should be noted is the fact that the preferred tantalum evaporator material may be used only at a maximum boiling temperature of the waste acid to be concentrated of less than 208° C.

The particular problem in the concentration of waste acids from nitration processes lies in the extraneous constituents originating from the nitration in the acid, more particularly in the form of compounds containing nitrogen-oxygen groups, such as nitric acid, various organics, principally MNT and DNT, and the dissolved nitrous constituents in the form of nitrosylsulfuric acid (NSS), the content of which is generally reported as the content of nitrous acid ($HNO_2$).

Since the substances mentioned, according to their character, are either potential starting materials or incompletely removed products or intermediates, the aim is naturally to be able to recover them, just like the sulfuric acid, and feed them very substantially back to the nitration process, and to keep the losses of these starting materials, intermediates and end products as low as possible. The prior art processes were, however, still suboptimal in this regard, especially when it is considered that such potentially useful products can also be found in other product streams of a process for nitration of aromatic compounds, for example in the scrubbing water of the process end product of the toluene nitration, DNT, isolated in crystalline form, which in many cases used to be discharged from the nitration process as waste streams or worked up separately. A DNT scrubbing water of the type mentioned contains acid, and it is therefore also referred to as "scrubbing acid", a term which is used primarily in the present description. A scrubbing acid may have, for example, a typical composition of 10-20% by mass of $HNO_3$, 5-12% by mass of $H_2SO_4$ (18-35% by mass of total acid) and dissolved nitroorganics (DNT, MNT).

The effect of the presence of the nitrogen-oxygen compounds mentioned, especially of the nitroorganics, in the waste acid is that the recovery and concentration of the sulfuric acid component is associated with particular technical difficulties. For instance, the proportions of the nitrated aromatics, which are nonvolatile solids which have a low solubility in and can precipitate out of aqueous media, can be deposited on plant parts, block them and thus disrupt the overall process. The proportions of nitric acid and nitroso compounds, in contrast, are relatively volatile and can be transferred to streams which evaporate off, but they are difficult to recover from these and can constitute a risk to the environment.

In the workup of waste acid for sulfuric acid concentration, the separation of the nitric acid from the concentrated sulfuric acid does not constitute any great technical problem due to the comparatively high volatility thereof. It passes mainly into the condensate of the vapor phase of a distillative separation of the waste acid ("vapor condensate"). The aim nowadays is to recover the nitric acid removed in this way, in an advantageous manner for process economics, substantially completely and in very highly concentrated form, such that it is reusable in the nitration process.

At the same time, the sulfuric acid is to be recovered from the waste acid substantially completely and with good purification in highly concentrated form, and the offgas and wastewater streams to be discharged from processes for workup of waste acid should be polluted to a minimum degree by pollutants such as nitrous gases and acids, and should also contain a minimum amount of heat as waste heat.

Therefore, in the last few years, various processes have been developed for workup of waste acid, which meet the above demands with greater or lesser perfection.

The modern relevant prior art includes, more particularly, processes according to EP 155 586 A1 or DE 34 09 719 A1, according to DE 196 36 191 B4, DE 10 2006 013 579 B3, and according to EP 1 876 142 B1. Explicit reference is made to the content of these documents to supplement the details which follow and give greater detail thereof. Reference is also made repeatedly to the documents cited in the description which follows.

As described, for example, in document DE 196 36 191 A1, the waste acid in the past was generally, in a stage for preconcentration, introduced to the upper part of a stripping column operated in countercurrent with steam, in order to virtually completely separate the nitric acid from the sulfuric acid. A further desired effect of this preconcentration by means of a stripping column was that it was also possible at the same time to remove a portion of the troublesome nitroorganics by stripping. The energy for such a preconcentration stage, which was operated predominantly under standard pressure, was supplied, according to the process, either indirectly by a dedicated heater, or else by direct steam introduced into the stripping column.

The top product obtained from the preconcentration stage was, after the total condensation thereof, inevitably a highly aqueous, DNT/MNT- and HNO$_3$-containing heterogeneous solution, from which the insoluble organic constituents which precipitate out as solids first had to be removed by gravity (settling). In order to recover the nitric acid present in the liquid phase obtained, it was necessary to integrate an additional subazeotropic rectification stage, which usually worked like the preconcentration stage at standard pressure, into the workup process, in order to obtain, in the bottoms of such a rectification, an approx. 45-50% nitric acid. This can be reused directly in the nitration by recycling in many nitration processes without any further increase in concentration, just like the deposited organics (principally DNT).

Since, in nitration processes, however, more highly concentrated nitric acid is always also required, an increase in concentration of the nitric acid is generally also provided in a special plant part.

The top product obtained from the above subazeotropic preconcentration is a relatively acid-free wastewater which can be used at least partly as scrubbing water for the stage of DNT scrubbing in the nitration process. The resulting wastewater with proportions of approx. 1 to 2% nitric acid leads, however, in a process on the industrial scale, to a perceptible loss of unutilized nitric acid and to a high nitrate burden on the wastewater, which can no longer be accepted nowadays.

One of the further significant disadvantages of such a preconcentration is that, for the rectification, the water discharged from the stripping column has to be evaporated and condensed a second time.

There have therefore already been descriptions of processes which had the aim of improving the mass and energy balance of the workup of the waste acid, and also of reducing the amount of wastewater or of increasing the wastewater quality, and in which, moreover, particular problematic process steps in the customary processes were to be improved or circumvented.

In the process described in patent specification DE 10 2006 013 579 B3, just like in the process according to EP 1 876 142 B1, the various process streams are combined in a very material- and energy-efficient manner. In the process according to DE 10 2006 013 579 B3, the top product obtained is, however, only a 20 to 40% nitric acid. In order to achieve the higher concentrations of nitric acid desired in the current modern processes for DNT preparation, it is necessary in a process according to DE 10 2006 013 579 B3 to effect a further concentration before the recycling of the nitric acid into the nitration process. This further concentration has to be performed in a further rectification stage, giving an additional wastewater which contains a low proportion of nitric acid, about 1 to 2%, and thus leads to additional nitrate/nitrite pollution in the wastewater. According to EP 1 876 142 B1, the process streams from the increase in concentration of the nitric acid are advantageously also combined with those of the actual workup of the waste acid.

Major problems in the concentration of an aqueous waste acid are presented by the nitroorganics dissolved therein, principally the DNT. Due to the limited miscibility of the nitroorganics in the aqueous feed acid, MNT and DNT are steam-volatile and can be stripped out of the acid by steam in principle due to the high pure substance boiling points. In the case of DNT, the highest-boiling of the nitroorganic compounds, however, the removal with stripping vapor in the customary prior art preconcentration stage is only inadequate.

The effect of the fact that considerable amounts of DNT were still present in the waste acid even after preconcentration thereof was, according to EP 0 155 586 B1, that further DNT got into the vapor condensate in the subsequent low-pressure stages of concentration of the waste acid in reduced pressure operation at about 100 mbar abs and lower, due to the thermodynamically improved conditions for the volatilization of the DNT. Since the vapors of the low-pressure stages have to be condensed at relatively low temperatures of <45° C. due to the reduced pressure in the system, the undissolved DNT precipitates out of the vapor condensates in solid form and considerably disrupts the continuous process for sulfuric acid concentration.

In order to avoid the problems which are caused by the DNT precipitation in the condensates of the vapors from the concentration of waste nitrating acid under reduced pressure, the route described in DE 196 36 191 B4 was selected, in which a stage of purification of the waste acid by stripping with a maximum amount of steam is inserted into the workup of the waste acid before the concentration under reduced pressure, in order to achieve virtually complete elimination of the nitroorganics, especially DNT which is difficult to strip and has a high pour point, in this stage from the output waste sulfuric acid (residual content <20 ppm), such that they no longer present any problems due to the DNT precipitations described in the aqueous condensates in the downstream concentration stages at 100 mbar (a) or lower.

DE 196 36 191 B4 describes the utilization of a stripping vapor consisting of the vapor from the reboiler of the stripping column and additional steam as fresh vapor for stripping of the organics, the amount of fresh steam supplied in addition being restricted to amounts in the range from 10 to 30% by mass, based on the incoming amount of prepurified waste acid.

In contrast, however, DE 10 2006 013 579 B3 describes a much smaller amount of stripping vapor, which is generated by the column reboiler, of only 0.25 to 10% by mass, based on the incoming amount of prepurified waste acid, which baldly contradicts plants detailed in DE 196 36 191 B4.

It is an object of the present invention, in the workup of the waste acid, to achieve a maximum concentration of the nitric acid and sulfuric acid recovered from the waste acid in an economically viable manner, and at the same time to ensure a reduction in the organic pollution of the wastewater compared to the present state of the art.

This object is achieved by a process according to the invention as per claim 1 and the advantageous configurations of such a process described in claims 2 to 14, and by a plant for performance of such a process, the basic features of which are described in claim 15 and the subsequent claims 16 to 18.

The process according to the invention in various variants and the plant for performance thereof are described in detail hereinafter with reference to two figures.

Figure 2:
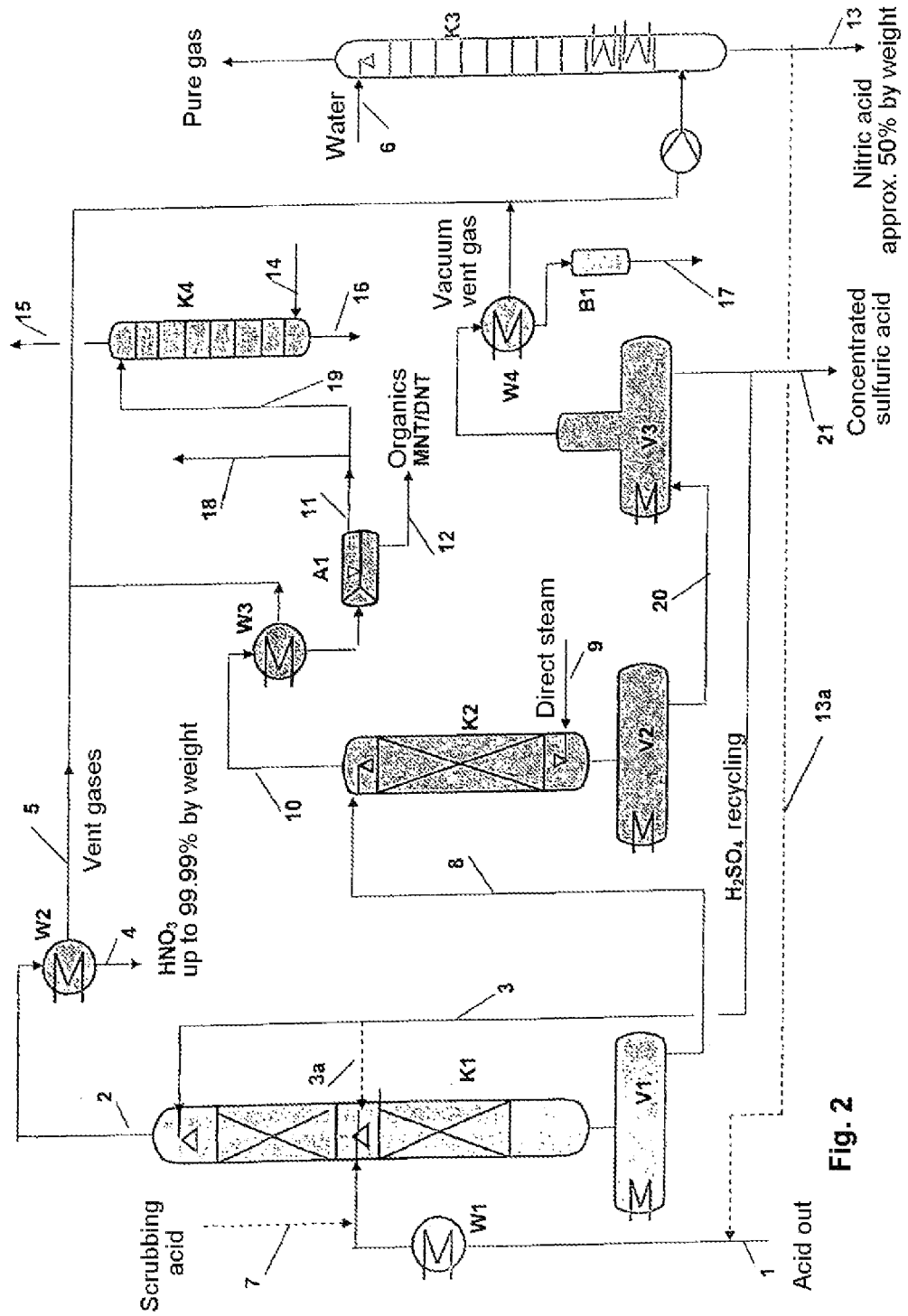

The figures show:

FIG. 1 a simplified process flow diagram of a conventional plant for workup of a waste acid using a stripping column and for further processing of the process streams obtained; and FIG. 2 a process flow diagram of an embodiment of a plant for implementation of the process according to the invention in a first process variant with a stripping column having a stripping section, a rectifying section and a feed for the waste acid in between.

The present invention relates, in its most general form, to a process for working up waste acid from processes for preparation of nitroaromatics, especially for preparation of dinitrotoluene (DNT) or else trinitrotoluene (TNT), to recover concentrated and purified sulfuric acid and nitric acid, in which, in a first stage, the waste acid is separated in a stripping column in countercurrent to steam from the bottom of the stripping column into at least one vaporous phase which comprises nitric acid with or without nitroorganics, and a preconcentrated sulfuric acid, and in which the vaporous phase and the preconcentrated sulfuric acid are then worked up in downstream process stages, wherein, in accordance with the invention, in the first stage of the process, in addition to the stripping, a concentration of the nitric acid present in the stripping vapor is performed in the presence of additional concentrated sulfuric acid supplied to the stripping column, such that nitric acid is obtained directly in the first stage in a highly concentrated form suitable for recycling into the nitration process.

It has been found that, surprisingly, the above measure, and additional measures matched to particular circumstances and prerequisites in the generation of the waste acid, as outlined in more detail below, compared to the known processes, for example according to DE 196 36 191 B4, DE 10 2006 013 579 B3 or according to EP 1 876 142 B1, can increase the concentration of the nitric acid recovered from the waste acid directly in a first process stage to up to 99.99% by weight, with a simultaneous reduction in wastewater pollutants and wastewater volumes.

The superazeotropic, up to almost 99.99% by mass, nitric acid thus obtainable, due to the lower recycling of water into the nitration stage, has a considerable influence on the extent and efficiency of nitration, which means a reduction in the costs of operation of the plant, and on the volume of output acid circulated, which means a reduction in the consumption of energy and in emissions.

In the text which follows, for explanation, the symbols ($K_x$, $V_x$, $W_x$) and reference numerals are used in some cases, and reference is made to the figures for definition thereof, more particularly FIG. 2.

In a process according to the invention for working up waste acid from processes for preparation of nitroaromatics, especially for preparation of dinitrotoluene (DNT) or trinitrotoluene (TNT), to recover concentrated and purified sulfuric acid and nitric acid, in which, in a first stage, the preheated waste acid which, as well as up to 80% by mass of sulfuric acid and water, as further constituents comprises nitric acid ($HNO_3$), nitrosylsulfuric acid (as $HNO_2$), and nitroorganics, especially DNT and mononitrotoluene (MNT), is separated in a stripping column in countercurrent to steam, which is obtained from the sulfuric acid preconcentrated by heating in the bottom of the stripping column, into at least one vaporous phase (vapor) which comprises nitric acid with or without nitroorganics, and a preconcentrated sulfuric acid, and in which, in downstream process stages (i), the preconcentrated sulfuric acid obtained from the bottom of the stripping column is supplied to a further purification for removal of nitroorganics and a higher concentration, and (ii) the nitric acid obtained from the vaporous nitric acid phase and the nitroorganics, including the nitroorganics obtained in the further purification and concentration of the preconcentrated sulfuric acid, are worked up and recycled back into the nitration process, the above object is in principle achieved in accordance with the invention in that, in the first stage of the workup process, in addition to stripping of the preheated waste acid in a stripping column in countercurrent to the steam from the sulfuric acid preconcentration (V1), a concentration of the nitric acid present in the stripping vapor is performed in countercurrent to additional purified and optionally fresh concentrated sulfuric acid with a concentration in the range from 75 to 97% and preferably 80 to 96% by mass, and the nitric acid vapors obtained from the top of the column of the first stage are condensed to obtain a nitric acid directly in a highly concentrated form advantageous for recycling into the nitration process.

In the first stage, additional sulfuric acid is supplied in such a concentration and amount that the partial pressure of the nitric acid in the stripping vapor at the top of the column of the first stage is increased so as to obtain a nitric acid concentration in the range from 40 to 99.99% by mass.

The first stage of the process can, depending on the specific starting conditions, be configured in different ways which will be explained individually in the description which follows.

In a first variant, the waste acid and the additional sulfuric acid can be fed to the top of a stripping acid at essentially the same height, preferably using a suitable distributor tray. In this case, the vapors from the evaporator of the stripping acid rise upward not just in countercurrent to the additional sulfuric acid, but also in countercurrent to the waste acid supplied, which flows downward into the evaporator of the stripping column. In this variant of the process according to the invention, the nitric acid, which is drawn off and condensed as vapor at the top of the stripping column, is concentrated up to approx. 70% by mass.

In another variant of the first stage, which is also shown in FIG. 2, the workup of the waste acid in the first stage is performed by supplying the waste acid preheated to a temperature just below the boiling temperature thereof to the middle region of a first column (K1) which has a stripping section arranged below the middle region for stripping of the waste acid in countercurrent to steam from the bottom (V1) and a rectifying section arranged above the middle region, and the additional sulfuric acid is supplied at least partly to the upper part of the rectifying section.

In a further variant of the first stage, the workup of the waste acid in the first stage is performed in such a way that the waste acid preheated to a temperature just below the boiling temperature thereof is supplied to the top of a column which works as a stripping column for stripping of the waste acid in countercurrent to the steam from the bottom, and which has, at its top, an additional separation device for removal of a liquid phase comprising nitroorganics (MNT/DNT) from the vapor phase comprising the nitric acid, and the vapor phase which comprises the nitric acid and is obtained from the stripping column with separation device is supplied directly to a separate rectifying column, the upper part of which is supplied with the additional concentrated sulfuric acid, the sulfuric acid obtained in the lower part of the rectifying column being transferred to the stripping column and ultimately being combined with the sulfuric acid in the bottom of the stripping column.

The first stage of the process is preferably performed at a pressure in the range from 600 to 2000 mbar, more preferably at atmospheric pressure.

The preconcentrated sulfuric acid obtained in the bottom of the column of the first stage, in the context of a preferred overall process, is fed to the upper part of a further stripping column (K2) which is operated at a reduced pressure between 250 mbar and 550 mbar, and residual amounts of nitroorganics are stripped out of the prepurified sulfuric acid in this further stripping column in countercurrent to the vapor phase from the heated bottom (V2) of this stripping column (K2) and optionally to additional direct steam, preferably in an amount of up to 10% by mass of the amount of prepurifed sulfuric acid which is fed to the stripping column, the vapor phase obtained at the top of the further stripping column (K2) being condensed to obtain an acidic aqueous nitroorganic condensate and, from the bottom (V2) thereof, a purified sulfuric acid.

A separator (A1) for the separation of the acidic condensate from the further stripping column (K2) is integrated in the process, and a separation into a nitroorganic phase which can be recycled into the nitration process and into an aqueous phase comprising residual amounts of nitroorganics is effected in the separator.

The aqueous phase comprising the residual amounts of nitroorganics from the separator (A1) is used partly for DNT scrubbing in the nitration process, and the predominant residual portion of this phase can be supplied, for further purification thereof, to a column (K4) for liquid/liquid extraction using an aromatic organic extractant, for example MNT or toluene, preferably toluene, and the resulting extractant phase laden with nitroorganics is preferably recycled into the nitration process.

It makes a contribution to the efficiency of the overall process when the waste acid, before the workup thereof in the first stage of the process, is also supplemented with the scrubbing acid from the stage of scrubbing with DNT in the nitration process.

The nitrogen oxide-containing gas phases obtained as vent gases in the condensation of the nitric acid vapors and if appropriate at other stages of the process are preferably scrubbed with water in a scrubbing column (K3) at an elevated pressure in the range from 1 to 7 bar to obtain a further amount of aqueous nitric acid, which, according to the concentration thereof and the specific circumstances of the respective process, can be recycled into the nitration or is added to the waste acid which is introduced into the first stage of the process according to the invention.

The condensation of the vapor phases (vapors) of the first stage and/or of the additional stripping column (K2) is conducted in warm water-fed heat exchanger-condensers (W2, W3), in order to prevent deposition of solid DNT, the temperature of the warm water for the heat exchanger-condensers (W2, W3) in one or more separate warm water circuits being kept within the range from 45° C. to 70° C. by addition of cold cooling water.

The additional sulfuric acid used, which is introduced into the first stage of the process according to the invention, is preferably a purified and highly concentrated sulfuric acid recovered in the workup of the waste acid. The purified sulfuric acid which is obtained as a bottom product of the further stripping column (K2) is concentrated in at least one further evaporator (V3) at a vacuum between 160 and 10 mbar to a concentration between 80 and 97% by mass, and, as mentioned, is used at least partly as additional sulfuric acid in the first stage of the process. The condensate, obtained at this stage, of the vapor phase from the further evaporator (V3) contains only a residual content of DNT of less than 150 ppm and can therefore be fed without problem to a further biological wastewater purification.

The waste acid, before it enters the column of the first stage, is preferably heated by heat exchange (W1) with the hot concentrated sulfuric acid from the evaporator (V3).

The stripping columns (K1, K2) and internals thereof, for example distributors and supports, and also random packings or structured packings used therein, are produced from corrosion-resistant materials, the preferred corrosion-resistant materials being selected from glass, ceramic materials and/or steel coated or lined with enamel or (hydro)fluorocarbon polymers.

A typical plant for performance of a process according to the invention has—as well as (a) a first stripping column (K1) with an inlet (1) for a waste acid to be worked up, an associated evaporator (V1) for obtaining a preconcentrated sulfuric acid and an outlet (2) at the top of the stripping column for a vapor phase comprising nitric acid, (b) a further stripping column (K2) with an associated evaporator (V2) for preparation of a purified sulfuric acid, (c) at least one further evaporator (V3) for the increase in concentration of the purified sulfuric acid, (d) heat exchanger-condensers (W2, W3, W4) for the vapor phases which are obtained as top products from the stripping columns (K1, K2) and evaporator (V3), optionally (e) a scrubbing column (K3) for scrubbing offgases containing nitrogen oxides, (f) the required pipeline for feeding in the starting materials (1, 7), for transporting and for distributing and leading off the vapor phases and liquid phases (2, 5, 8, 10, 21) obtained as process streams and the process products and offgases (4, 12, 13, 17, 18, 21) and comprising (g) the required heating, cooling and pressure regulation devices—as the special feature, provision of the first stripping column (K1) with an inlet (3, 3a) for a highly concentrated purified sulfuric acid, preferably for one which has been obtained in the workup of the waste acid in the at least one evaporator (V3).

The inlet (3, 3a) is connected to the top and optionally the middle part of the first column (K1). In one variant, the first column is divided into a column with a stripping section below the inlet and a separate column which serves as a rectifying section, with a separation device in the form of a quencher or dephlegmator for removal of an aqueous phase comprising nitroorganics arranged in the upper part of the stripping section, and with the inlet for the highly concentrated, purified sulfuric acid connected to the rectifying section.

In a particularly preferred configuration, the plant may additionally have an extraction column (K4) with an extractant inlet (14) for a liquid/liquid extraction of an aqueous phase which has been obtained by phase separation of the acidic condensate from the second stripping column (K2) in a separator (A1).

A currently preferred embodiment of the process according to the invention is explained in more detail hereinafter, with reference to the figures, more particularly to FIG. 2.

A waste acid 1 from the nitration of aromatics is, after preheating in a heat exchanger W1, supplied to a first column K1 which operates under atmospheric conditions and works as a stripping column. The amount of ascending steam which is produced in the course of concentration of the sulfuric acid in the bottom V1 of column K1 is adjusted in the course of stripping, as known per se, so as to achieve a maximum concentration of nitric acid in the vapor phase (the vapor) 2, which is drawn off at the top of the column.

At a concentration of nitric acid in the waste acid of about 2% by mass, a concentration of nitric acid of max. 40% by mass is achieved at the top of the column. If the starting concentration in the output acid, however, is below 1%, which is usually the case, it is possible at the top of the column to achieve only nitric acid concentrations of less than 10% by mass.

Since, under practical conditions, the concentrations of the incoming waste acid from the nitration process, however, are not always constant and can vary significantly, in the conventional process as shown in simplified form in FIG. 1, very different nitric acid concentrations are obtained over time, the result of which is that, in a known process, for example according to FIG. 1, an additional column (not shown) is always required for increasing the concentration of the dilute nitric acid obtained from stripping column K1, which is associated with the known problems such as nitrate/nitrite formation.

The inventors have now found that the above problems can surprisingly also be solved without using an additional column for increasing the concentration, by, whenever the concentration of the sulfuric acid in the waste acid does not go below a particular value, keeping the achievable nitric acid concentration constant at the top of column K1, and at the same time obtaining a prepurified sulfuric acid free of nitric acid in the bottom of column K1.

By recycling sulfuric acid 3 from the sulfuric acid concentration in V3, or if appropriate by adding fresh concentrated sulfuric acid in each case with a concentration of 75 to 97 and preferably 80 to 96% by mass, the incoming waste acid can be adjusted so as to obtain a nitric acid 4 of up to 99.99% by mass.

According to the invention, it is possible to work up to a concentration of nitric acid in the vapor of the stripping column of 70%, by introducing the sulfuric acid to the top of a stripping column at essentially the same height as the waste acid to be worked up, using a distributor tray for two different liquid feed products, for example one of the applicant's distributor trays with the trade name "Core-Tray".

If a higher concentration of nitric acid of up to 99.99% by mass is desired, the concentrated sulfuric acid according to 3 has to be introduced at the top of a supplementary rectifying column, i.e. at the top of a column section above the feed of the waste acid 1, which is arranged in the middle part of a column (K1) divided into a stripping section and a rectifying section.

The nitrous gases 5 (NOx) released in the course of decomposition of the nitrosylsulfuric acid present in the waste acid leave with the nitric acid vapors at the top of column K1 and are, in a preferred embodiment, after condensation of the mixture of nitric acid, water and nitroaromatics in the heat exchanger-condenser W2, fed to an NOx absorption in a special column K3 in which the NOx gas is recovered again as nitric acid 13 with water 6 at elevated pressure. A portion of this acid 13a, or the entirety thereof, can be sent back to the first column for further concentration, or the acid 13 is supplied to the nitration as a stream without additional concentration. The latter variant, however, has the disadvantage that a higher amount of water is recycled, resulting in an increase in the amount of liquid in the waste acid circuit.

If the proportions of nitroaromatics in the waste acid are in the range of such high amounts that they give reason for safety concerns, the organic nitro compounds are removed almost completely by suitable measures, for example by arrangement of a quench or of a dephlegmator, for safety reasons prior to the superazeotropic increase in concentration in the rectifying section, i.e. between rectifying section and stripping section.

An additional considerable advantage of this mode of operation is that no additional wastewater containing highly toxic nitrite/nitrate is obtained.

The scope of the present invention also includes feeding the scrubbing acid 7 from the DNT scrubbing of the nitration process at least partly together with the waste acid from the first column K1 to the removal and concentration of the nitric acid and to the preconcentration of the sulfuric acid, as described above. This makes it possible in accordance with the invention to recover and to concentrate these acids without additional generation of nitrate/nitrite wastewater.

The preconcentrated but nitrate-free waste acid 8 obtained in the bottom V1 of the first column K1 in the form of a prepurified and preconcentrated sulfuric acid is then supplied to a further stripping column K2 operated under reduced pressure, in order to completely remove the remaining organic nitro compounds, particularly DNT, by stripping.

Column K2 is, in order to work above the freezing point or solidification point of steam-volatile aromatic nitro compounds, i.e. of DNT, operated at a reduced pressure between 250 mbar and 550 mbar, preferably between 300 and 450 mbar. It has been found that, surprisingly, in contrast to the teaching in document DE 10 2006 013 579 B3, in addition to the vapor from the reboiler V2 of column K2, in the course of simultaneous concentration of the sulfuric acid, small amounts of additional direct steam 9, what is called a lifesteam, are also required to obtain, in the bottom V2, a sulfuric acid free of DNT (less than 20 ppm by mass). The amount of direct steam used may, according to the feed composition of the preconcentrated waste acid, be between 0 and 9.99% of the waste acid feed.

The constituents present in the vapor 10 of the vacuum stripping column K2, such as principally water, nitroaromatics such as MNT/DNT and sulfuric acid traces, are indirectly condensed in a heat exchanger-condenser W3 with circulated warm water as a cooling medium and separated in a separator A1 into an acidic aqueous phase and a phase comprising organic compounds. The aqueous condensate obtained has a low sulfuric acid content and contains only traces of organic impurities (approx. 1500 ppm by mass of DNT). It can be reused at least partly, by transport through a line 18, for acidic scrubbing of the DNT in the nitration. The residual portion of the acidic condensate 19 comprising the nitroaromatics MNT/DNT, which are difficult to degrade, is treatable thermally or thermochemically only in a very energy-intensive manner, and can, in a particular variant of the process according to the invention, be purified by a downstream extraction in a column for countercurrent liquid extraction with a liquid extractant 14, preferably an aromatic extractant such as toluene or MNT, to such an extent that a wastewater 16 which has a concentration of nitroaromatics, such as DNT, of only up to 1 ppm by mass, and which can be supplied to a simple biological wastewater purification, is obtained.

The extractant 15 laden with the extracted nitroaromatics is preferably returned to the mono stage of the nitration.

The separated nitroaromatics 12 such as MNT/DNT from the separator A1 are likewise fed back to the nitration.

It has also been found that, surprisingly, in the case of particular compositions of the waste acid, especially at a nitric acid content of more than 2% by mass, it is even possible to combine the first column K1 and the vacuum stripping column K2, it being possible under the prerequisite mentioned to obtain the same advantageous results as in the embodiments described above.

The virtually DNT-free concentrated sulfuric acid 20 obtained in the bottom of column K2 is fed to a one-stage or multistage vacuum concentration and brought to a concentration between 85% by mass and 97% by mass at a vacuum between 160 mbar and 10 mbar. The sulfuric acid 21 thus concentrated, which is free of DNT, can be fed back to the nitration, but, in the process according to the invention, is preferably used at least partly as additional sulfuric acid, which is supplied via lines 3 or 3a to the column K1 of the first process stage of the process according to the invention.

As a result of the almost complete stripping of the DNT in accordance with the invention in column K2, the vapor phase of the vacuum concentration stages V3 contains only very small amounts of DNT, of less than 150 ppm by mass, and, after condensation in a heat exchanger-condenser W4, the aqueous condensate can be passed via a condensate vessel B1 as stream 17 directly to a biological wastewater purification.

Important advantages of the process according to the invention can be summarized as follows:

In the process according to the invention, as early as in the first stage, in the first stripping, which preferably proceeds under atmospheric pressure, all of the nitric acid is recovered in concentrated form, such that, in contrast to a process as described in patent specification DE 10 2006 013 579 B3, no further separate concentration of the dilute nitric acid is required, with the disadvantage of obtaining nitrate/nitrite-containing wastewater.

According to the invention, a superazeotropic increase in concentration of the nitric acid up to 99.99% by mass is achieved by recycling a portion of the concentrated sulfuric acid present in the concentration circuit, such that there is no need to use any additional material extraneous to the overall process.

In the process according to the invention, moreover, in contrast to the process according to patent specification DE 196 36191 B4, the amount of direct steam required and hence the amount of polluted wastewater produced is greatly reduced. In a particularly favorable concentration range of the sulfuric acid in the waste acid of approx. 67% by weight on entry to the stripping column K2, it is possible to entirely dispense with additional direct steam, although, in accordance with the invention, in contrast to patent specification DE 10 2006 013 579 B3, which teaches an amount of stripping vapor of 5 to 10%, based on the incoming amount of waste acid, it is always necessary for a vapor content of greater than 10% by mass of the incoming amount of waste acid to be present in the column, as was found in accordance with the invention by tests.

The invention claimed is:

1. A process for recovery of concentrated and purified sulfuric acid, and nitric acid from waste acid from processes for preparation of nitroaromatics, the process comprising,
   (a) a first stage comprising
      (i) feeding a waste acid, in preheated form, comprising up to 80% by mass of sulfuric acid, water, nitric acid ($HNO_3$), nitrosylsulfuric acid (as $HNO_2$), and nitroorganics into a first stripping column; and
      (ii) separating said waste acid in countercurrent to steam, wherein said stream is obtained by heating the sulfuric acid to at least one vaporous phase, which is recovered from a top portion of the first stripping column, the vaporous phase comprising nitric acid, and accumulating sulfuric acid in a bottom portion of the first stripping column; and
   (b) a second stage comprising
      (i) supplying the sulfuric acid obtained from the bottom portion of the first stripping column to a further purification step for removal of nitroorganics and for higher concentrating of the sulfuric acid; and
      (ii) working up and recycling back into a nitration process, the nitric acid obtained from the vaporous nitric acid phase and the nitroorganics, including the nitroorganics obtained in the further purification and concentrating of the sulfuric acid,
   wherein,
   the first stage of the process further comprises concentrating the nitric acid present in the at least one vaporous phase in countercurrent to additional purified sulfuric acid having a concentration in the range from 75 to 97% by mass, and the nitric acid vapors obtained from the top portion of the first stripping column of the first stage are condensed to obtain a nitric acid directly in a highly concentrated form suitable for recycling into the nitration process.

2. The process of claim 1, wherein, in the first stage, said additional purified sulfuric acid is supplied in such a concentration and amount that the partial pressure of the nitric acid in the at least one vaporous phase recovered from the top portion of the first stripping column of the first stage is increased so as to obtain a nitric acid concentration in the range from 40 to 99.99% by mass.

3. The process of claim 1, wherein, the nitric acid product having a concentration of up to about 70% by mass is prepared by introducing the waste acid and said additional purified sulfuric acid at about the same height to the top portion of the first stripping column, and drawing off the at least one vaporous phase which forms the concentrated nitric acid at the top portion of the first stripping column.

4. The process of claim 1, wherein, the workup of the waste acid in the first stage is performed by supplying the waste acid in a form preheated to a temperature just below the boiling temperature thereof to a middle region of the first stripping column (K1) which has a stripping section positioned below said middle region for stripping of the waste acid in countercurrent to steam from the bottom portion of said stripping column and a rectifying section positioned above said middle region, and that said additional purified sulfuric acid is supplied at least partly to the upper part of the rectifying section.

5. The process of claim 1, wherein, the workup of the waste acid in the first stage is performed in such a way that the waste acid in a form preheated to a temperature just below the boiling temperature thereof is supplied to the top portion of the first stripping column which strips the waste acid in countercurrent to the steam from the bottom portion of the first stripping column, and which has, at its top, an additional separation device for removal of a liquid phase comprising nitroorganics (MNT/DNT) from the vapor phase comprising nitric acid, and in that the vapor phase which comprises the nitric acid and which is obtained from the stripping column and the separation device is supplied directly to an associated rectifying column, to the upper part of which said additional concentrated sulfuric acid is supplied, the sulfuric acid obtained in the lower part of the rectifying column being transferred to the stripping column and being combined with the sulfuric acid in the bottom of the stripping column.

6. The process of claim 1, wherein, the first stage of the process is performed at a pressure in the range from 600 to 2000 mbar.

7. The process of claim 1, wherein, the sulfuric acid obtained from the accumulation in the bottom portion of the first stripping column of the first stage is fed to an upper portion of a second stripping column (K2) which is operated at a reduced pressure between 250 mbar and 550 mbar, and residual amounts of nitroorganics are stripped out of the sulfuric acid in this second stripping column in countercurrent to a vapor phase from bottom portion (V2) of second stripping column (K2) that is heated obtaining at the top of the second stripping column (K2) a vapor phase which subsequently is condensed to obtain an acidic aqueous nitroorganic condensate and, from the bottom portion (V2) of the second stripping column, a purified sulfuric acid.

8. The process of claim 7, wherein, for the separation of the acidic condensate from the second stripping column (K2), a separator (A1) is integrated in the process, in which a separation into a nitroorganic phase, which can be recycled into the nitration process, and into an aqueous phase comprising residual amounts of nitroorganics is effected.

9. The process of claim 7, wherein, the condensation of the vapor phases of the second stripping column (K2) is conducted in warm water-fed heat exchanger-condensers (W2, W3), in order to prevent deposition of solid DNT, the temperature of the warm water for the heat exchanger-condensers (W2, W3) in at least one warm water circuits being kept within the range from 40° C. to 70° C. by addition of cold cooling water.

10. The process of claim 7, wherein the second stripping column (K2) is produced from corrosion-resistant materials selected from glass, ceramic materials and/or steel coated or lined with enamel or (hydro)fluorocarbon polymers.

11. The process of claim 8, wherein, the aqueous phase comprising residual amounts of nitroorganics from the separator (A1) is used partly for dinitrotoluene (DNT) washing in the nitration process, and partly is supplied, for further purification thereof, to a third stripping column (K4) for liquid/liquid extraction using an aromatic organic extractant and the resulting extractant phase laden with nitroorganics is supplied to the nitration process.

12. The process of claim 1, wherein, the waste acid, before being fed to the first stage of the process, is supplemented with washing acid from washing DNT product.

13. The process of claim 1, wherein, the nitric acid present in the at least one vaporous phase is scrubbed with water in a scrubbing column (K3) at an elevated pressure in the range from 1 to 7 bar to obtain a further amount of aqueous nitric acid.

14. The process of claim 1, wherein, the condensation of the vapor phases of the first stage is conducted in warm water-fed heat exchanger-condensers (W2, W3), in order to prevent deposition of solid DNT, the temperature of the warm water for the heat exchanger-condensers (W2, W3) in one or more separate warm water circuits being kept within the range from 40° C. to 70° C. by addition of cold cooling water.

15. The process of claim 7, wherein, the purified sulfuric acid obtained as a bottom product of the second stripping column (K2) is concentrated in at least one further evaporator (V3) at a vacuum between 160 and 10 mbar to a concentration between 85 and 97% by mass, and is used at least partly as said additional sulfuric acid in the first stage of the process.

16. The process of claim 1, wherein the first stripping columns (K1 is produced from corrosion-resistant materials elected from glass, ceramic materials and/or steel coated or lined with enamel or (hydro)fluorocarbon polymers.

17. A system for performing a process of claim 1, comprising a first stripping column (K1), having an upper portion and a bottom portion, with a first inlet (1) for a waste acid to be worked up, an associated evaporator (V1) for obtaining a preconcentrated sulfuric acid and an outlet (2) for a vapor phase comprising nitric acid, a second stripping column (K2) with second associated evaporator (V2) for preparation of a purified sulfuric acid, and at least one third evaporator (V3) for the increase in concentration of the purified sulfuric acid, heat exchanger-condensers (W2, W3, W4) for condensing vapor phases which are obtained as top products from the first and second stripping columns (K1, K2) and at least one third evaporator (V3), and further, the required piping for feeding in the starting materials (1, 7), for transporting and for distributing and leading off the vapor phases and liquid phases (2, 5, 8, 10, 21) obtained as process streams and process products and offgases (4, 12, 13, 17, 18, 21), and the required heating, cooling and pressure regulation devices, wherein the first stripping column (K1) is provided with a second inlet and a third inlet (3, 3a) for a highly concentrated purified sulfuric acid which has been obtained in the workup of the waste acid downstream in the process, which the second and third inlets (3, 3a) are connected to the upper portion of the first column (K1).

18. The system of claim 17, wherein, the first column is divided into a first portion working as stripping column and a second portion working as rectifying column, with a separation device in the form of a quencher or dephlegmator arranged in the upper part of the stripping section for removal of a liquid phase comprising nitroorganics, and wherein the top of the stripping column is provided with means for transferring a vapor phase to an associated rectifying column which has, at its top, an inlet for said highly concentrated, purified sulfuric acid.

19. The system of claim 17 further comprising an extraction column (K4) with an inlet (14) for a liquid extractant for a liquid/liquid extraction of an aqueous phase obtained by phase separation of the acidic condensate from the second stripping column (K2) in a separator (A1).

20. The sysem of claim 17 further comprising a scrubbing column (K3) for scrubbing offgases containing nitrogen oxides.

* * * * *

UNITED STATES PATENT AND TRADEMARK OFFICE
CERTIFICATE OF CORRECTION

| | | |
|---|---|---|
| PATENT NO. | : 9,108,847 B2 | Page 1 of 1 |
| APPLICATION NO. | : 13/395810 | |
| DATED | : August 18, 2015 | |
| INVENTOR(S) | : Dichtl et al. | |

It is certified that error appears in the above-identified patent and that said Letters Patent is hereby corrected as shown below:

In the claims

Column 12, Line 11: Claim 1, Delete "said stream" and insert -- said steam --

Signed and Sealed this
Twenty-third Day of February, 2016

Michelle K. Lee
*Director of the United States Patent and Trademark Office*